United States Patent
Somasiri et al.

(10) Patent No.: US 10,121,570 B2
(45) Date of Patent: Nov. 6, 2018

(54) DIELECTRIC MATERIAL WITH ENHANCED BREAKDOWN STRENGTH

(71) Applicant: 3M INNOVATIVE PROPERTIES COMPANY, St. Paul, MN (US)

(72) Inventors: Nanayakkara L. D. Somasiri, Austin, TX (US); Paul V. Huynh, Pflugerville, TX (US); Andrew C. Lottes, Austin, TX (US); William L. Taylor, Round Rock, TX (US); Levent Biyikli, Cedar Park, TX (US); Carl E. Fisher, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/519,399

(22) PCT Filed: Oct. 14, 2015

(86) PCT No.: PCT/US2015/055534
§ 371 (c)(1),
(2) Date: Apr. 14, 2017

(87) PCT Pub. No.: WO2016/061230
PCT Pub. Date: Apr. 21, 2016

(65) Prior Publication Data
US 2017/0250008 A1    Aug. 31, 2017

Related U.S. Application Data

(60) Provisional application No. 62/065,096, filed on Oct. 17, 2014.

(51) Int. Cl.
*H01B 7/00* (2006.01)
*H01B 9/02* (2006.01)
(Continued)

(52) U.S. Cl.
CPC ........... *H01B 9/027* (2013.01); *C09J 7/00* (2013.01); *H01B 9/021* (2013.01); *H01B 17/32* (2013.01);
(Continued)

(58) Field of Classification Search
CPC . H01B 9/00; H01B 9/02; H01B 9/021; H01B 9/027; H01B 17/00; H01B 17/02; H01B 17/60; C09J 7/00; C09J 2203/302
(Continued)

(56) References Cited

U.S. PATENT DOCUMENTS 3,646,248 A  *  2/1972  Ling ................... B29C 47/0004
174/102 SC
3,666,876 A       5/1972  Forster
(Continued)

FOREIGN PATENT DOCUMENTS

CN     102382445    3/2012
EP     0645781      3/1995
(Continued)

OTHER PUBLICATIONS

Denka Company Website, Denka Elastomer & Permance Plastics, Denka Black Production Information, Characerisitics, Uses, and More Information, pp. 1-6, Feb. 2, 2018.*
(Continued)

*Primary Examiner* — William H Mayo, III
(74) *Attorney, Agent, or Firm* — Gregg H. Rosenblatt (57) ABSTRACT

An enhanced breakdown strength dielectric material includes a base dielectric layer having first and second opposing major surfaces. A first stress mitigating layer is disposed on the first major surface of the base dielectric layer. A second stress mitigating layer disposed on the second major surface of the base dielectric layer. A volume conductivity of at least one of the first and second stress
(Continued)

mitigating layers is at least 2 times a volume conductivity of the base dielectric layer.

16 Claims, 5 Drawing Sheets

(51) Int. Cl.
    *H01B 17/32*     (2006.01)
    *H01B 17/60*     (2006.01)
    *C09J 7/00*     (2018.01)

(52) U.S. Cl.
    CPC ........ *H01B 17/60* (2013.01); *C09J 2203/302* (2013.01)

(58) Field of Classification Search
    USPC ............. 174/102 R, 105 SC, 102 SC, 120 R, 174/120 SC, 102 SR
    See application file for complete search history.

(56) References Cited

U.S. PATENT DOCUMENTS

| | | | | |
|---|---|---|---|---|
| 4,388,227 | A * | 6/1983 | Kalnin | .................... D01F 11/12 |
| | | | | 106/472 |
| 5,636,100 | A | 6/1997 | Zheng | |
| 6,506,492 | B1 * | 1/2003 | Foulger | .................... H01B 1/22 |
| | | | | 174/110 PM |
| 7,323,500 | B2 | 1/2008 | Schindler | .............. C14C 11/003 |
| | | | | 523/201 |
| 7,868,079 | B2 * | 1/2011 | Onneby | ................. B82Y 30/00 |
| | | | | 257/659 |
| 2002/0183207 | A1 * | 12/2002 | Hjortstam | .............. B82Y 10/00 |
| | | | | 505/100 |
| 2010/0231228 | A1 * | 9/2010 | Koelblin | ................ H01B 9/027 |
| | | | | 324/544 |
| 2010/0302707 | A1 | 12/2010 | Tan | |
| 2014/0083739 | A1 * | 3/2014 | Jeker | ........................ H01B 1/24 |
| | | | | 174/120 SC |
| 2014/0182886 | A1 * | 7/2014 | Sonerud | .................. C08L 23/12 |
| | | | | 174/120 SC |

FOREIGN PATENT DOCUMENTS

| | | | | |
|---|---|---|---|---|
| EP | 1280167 A1 * | 7/2002 | .............. H01B 9/02 |
| EP | 1786006 | 5/2007 | |
| GB | 854774 | * 6/1958 | .............. H01B 7/00 |
| GB | 854774 | 11/1960 | |
| WO | 1998-34245 | 8/1998 | |

OTHER PUBLICATIONS

Fillery, "Nanolaminates: Increasing Dielectric Breakdown Strength of Composites", ACS Applied Materials & Interfaces, 2012, vol. 04, pp. 1388-1396.

Jarry, ""Best-Offer" Purchasing of Medium Voltage Joints Based on Robustness Test", CIRED Workshop, Paper0091, 2010, pp. 1-3.

Mackey, "Enhanced breakdown strength of multilayered films fabricated by forced assembly microlayer coextrusion", Journal of Physics D: Applied Physics, 2009, vol. 42, pp. 1-12.

International Search Report for PCT International Application No. PCT/US2015/055534, dated Feb. 15, 2016, 4 pages.

\* cited by examiner

DIELECTRIC MATERIAL WITH ENHANCED BREAKDOWN STRENGTH

TECHNICAL FIELD

This invention relates to a dielectric material having enhanced dielectric breakdown strength and other properties useful for electrical applications.

BACKGROUND

Solid dielectric insulation materials are commonly used as insulation in electric power applications involving cables, accessories, transformers, power generators, power capacitors and the like, primarily to sustain the system voltage. Typical dielectric insulation materials include ethylene propylene diene monomer (EPDM) rubber, ethylene propylene rubber (EPR), and silicone. Medium and high voltage power cables typically comprise a conductor surrounded by a semiconductive layer and then a dielectric insulating layer to control the electric field around the conductor. Insulation materials also play the vital role of electrical stress control in cable accessories. Underground accessories, in particular, need to provide stress control in order to maintain and control the electrical stress below the breakdown level of the dielectric layer. As the dielectric breakdown strength of the dielectric material is increased, a thinner insulating layer is required for the cable or accessory to perform at the same voltage level. Cables and accessories that incorporate dielectric materials with increased dielectric breakdown strength can therefore be made smaller, lighter, and at a reduced cost in comparison to cable and accessories made with traditional insulating materials, with comparable voltage performance. This is especially important at transmission voltages, but is also important for medium voltage class cables and accessories.

As the demand for global electric power continues to rise, the need for improved medium and high voltage power components remains. Accordingly, there is a need for insulation materials having increased dielectric breakdown strength.

SUMMARY

According to a first aspect of the invention, an enhanced breakdown strength dielectric material comprises a base dielectric layer having first and second opposing major surfaces. A first stress mitigating layer is disposed on the first major surface of the base dielectric layer. A second stress mitigating layer disposed on the second major surface of the base dielectric layer. A volume (bulk) conductivity of at least one of the first and second stress mitigating layers is at least 2 times a volume conductivity of the base dielectric layer.

In another aspect, at least one of the stress mitigating layers comprises a filler material dispersed in a binder material.

In another aspect, at least one of the first and second stress mitigating layers comprises a semiconductor filler material.

In another aspect, the semiconductor filler material comprises a material selected from the group consisting of silicon (Si), germanium (Ge), gallium arsenide (GaAs), boron arsenide (BAs), indium phosphide (InP), indium arsenide (InAs), gallium antimonide (GaSb), indium antimonide (InSb), gallium phosphide (GaP), boron phosphide (BP), aluminum antimonide (AlSb), aluminum arsenide (AlAs), aluminum phosphide (AlP), cadmium sulfide (CdS), cadmium selenide (CdSe), zinc sulfide (ZnS), zinc oxide (ZnO), copper sulfide ($Cu_2S$), silver sulfide ($Ag_2O$), molybdenum disulfide ($MoS_2$), tungsten disulfide ($WS_2$), nickel (II) phosphide (Ni P), tin (II) sulfide (SnS), tin (IV) sulfide ($SnS_2$), lead (II) sulfide (PbS), lead selenide (PbSe), copper (I) oxide ($Cu_2O$), copper (II) oxide (CuO), nickel II oxide (NiO), tin dioxide ($SnO_2$), tin (II) oxide (SnO), molybdenum dioxide ($MoO_2$), titanium dioxide ($TiO_2$), silver gallium arsenide (AgGaAs), and barium titanate ($BaTiO_3$).

In another aspect, the semiconductor filler material comprises a low band gap semiconducting material.

In another aspect, the filler material comprises a material selected from the group consisting of a doped semiconductor and a semiconductor having vacancies and interstitial defects in the lattice structure formed during synthesis.

In another aspect, the filler material comprises a high band gap (insulating) material.

In another aspect, the filler material comprises a material selected from the group consisting of boron nitride (BN), aluminum nitride (AlN), mica, and alumina ($Al_2O_3$).

In another aspect, the filler material comprises a conductive material selected from the group consisting of a metal, graphene, carbon black, carbon nanotubes, a doped semiconductor, and combinations thereof.

In another aspect, at least one of the stress mitigating layers comprises about 0.5 volume % to about 100 v % filler material relative to the total volume of the layer.

In another aspect, the filler material comprises one or more particulates, each having a shape selected from spheres, plates, platelets, cubes, needles, oblate, spheroids, pyramids, prisms, flakes, rods, fibers, chips, whiskers, and mixtures thereof.

In another aspect, the size of each filler material particulate can be from about 10 nm to about 100 μm.

In another aspect, at least one of the first and second stress mitigating layers comprises a binder material.

In another aspect, the binder material comprises a polymer.

In another aspect, the binder material comprises a polymer selected from the group consisting of silicone, poly (vinyl chloride), EPDM rubber, EPR, EVA, polyimide, fluoropolymers, epoxies, polysulfides, polyethylene, and polyester.

In another aspect, each stress mitigation layer further comprises an additive.

In another aspect, the additive comprises at least one of solvents, dispersing agents, defoaming agents, and surfactants.

In another aspect, the first stress mitigating layer and the second stress mitigating layer are formed from different materials.

In another aspect, the base dielectric layer comprises a material selected from the group consisting of polymers and insulating materials.

In another aspect, the base dielectric layer comprises one of silicone, poly(vinyl chloride), polyimide, polyethylene, and polyester.

In another aspect, each stress migrating layer has a volume conductivity from about $1\times10^{-12}$ S/m to about $1\times10^{-8}$ S/m.

In another aspect, each stress migrating layer has a volume conductivity from about $1\times10^{-11}$ S/m to about $1\times10^{-9}$ S/m.

In another aspect, the base dielectric layer has a volume conductivity from about $1\times10^{-12}$ S/m to about $1\times10^{-10}$ S/m.

In another aspect, each stress migrating layer comprises a $MoS_2$ filler material having a concentration of about 0.8% to about 12% by volume based on the total volume of the stress migrating layer.

In another aspect, each stress migrating layer comprises a $WS_2$ filler material having a concentration of about 0.5% to about 16% by volume based on the total volume of the stress migrating layer.

In another aspect, each stress migrating layer comprises a silicon filler material having a concentration of about 2% to about 15% by volume based on the total volume of the stress migrating layer.

In another aspect of the invention, a power cable comprises a conductor, a first shielding layer surrounding the conductor and an insulation layer comprising the enhanced breakdown strength dielectric material described herein. The power cable further includes a second shielding layer surrounding the insulation layer and a protective jacket surrounding the second shielding layer.

In another aspect of the invention, a dielectric stress control device comprises a shaped body that includes an insulation layer comprising the enhanced breakdown strength dielectric material described herein.

In another aspect of the invention, a cable accessory comprises the enhanced breakdown strength dielectric material described herein.

As used in this invention:

"Stress mitigation layer" means an insulating layer that reduces regions of high electrical stress, such as at the interface of a dielectric base material and a conductive electrode, and that can comprise, for example, a mixture of a filler material and a dielectric binder material.

"Insulating layer" refers to a material having a volume conductivity less than about $10^{-5}$ S/m.

"Enhanced breakdown strength" refers to the breakdown strength of the multi-layer material being greater than the breakdown strength of the base dielectric material.

The above summary of the present invention is not intended to describe each disclosed embodiment or every implementation of the present invention. The Figures and detailed description that follow below more particularly exemplify illustrative embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be used, and structural or logical changes may be made without departing from the scope of the present invention. The following detailed description, therefore, is not to be taken in a limiting sense, and the scope of the invention is defined by the appended claims.

There is a need in the electric power industry for thinner, lighter and more compact components to increase the power capacity in existing infrastructure. Limitations in dielectric breakdown strength in current insulation materials are conventionally seen as a barrier to such thinner, lighter and more reliable components for the same voltage levels. As described herein, the dielectric material embodiments of the present invention can provide a significant increase in insulation breakdown strength over conventional materials. Such enhanced breakdown strength dielectric materials can be used in making power cables and accessories, such as splices and terminations (including modular accessories), insulating tapes and papers, etc., all having reduced insulation thickness and improved dielectric breakdown strength. Further embodiments of the present invention can provide water robustness, allowing for more reliable power cable accessory operations in wet conditions.

Figure 1:
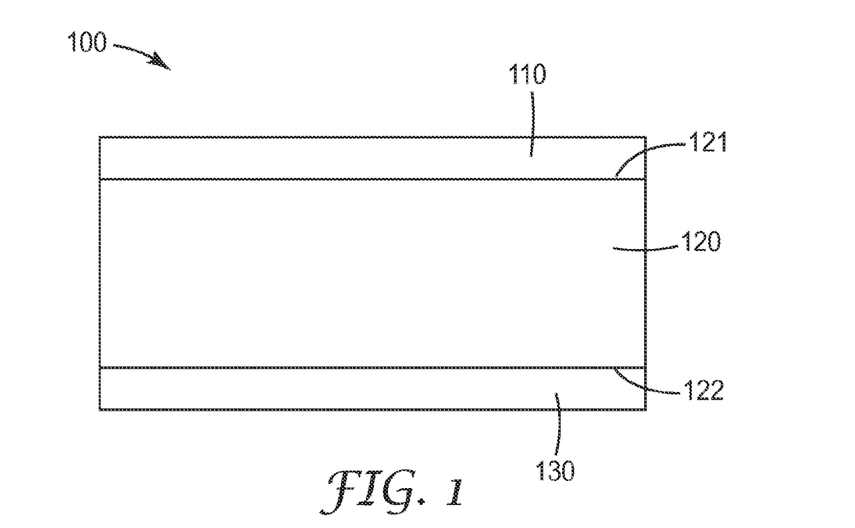
FIG. 1 is a side view of an enhanced breakdown strength material according to a first aspect of the invention.

FIG. 1 shows a first aspect of the present invention, an enhanced breakdown strength multi-layer material 100. Material 100 includes a base dielectric layer (or substrate) 120 having first and second opposing major surfaces 121 and 122. A first stress mitigating layer 110 is disposed on the first major surface 121 of the base dielectric layer 120. A second stress mitigating layer 130 is disposed on the second major surface 122 of the base dielectric layer 120. As shown in multiple examples herein, in one aspect of the invention, the volume conductivity of the first stress mitigating layer 110 is at least 2 times the volume conductivity of the base dielectric layer 120. In another aspect, the volume conductivity of the first and second stress mitigating layers 110 is between 2 times and 100 times the volume conductivity of the base dielectric layer 120. When the multi-layer material is in contact with a semiconducting or conducting material (as in, e.g., an electrical cable), this difference level in volume conductivity between the base dielectric layer and the stress mitigating layer(s) introduces a conductivity gradient into the structure. Therefore, the conductivity of each of the interfacial stress mitigating layers is preferably higher than the conductivity of the base layer and lower than the semiconducting or conducting material. Surface defects, such as charge traps, present on the surface(s) of the base dielectric layer become less significant for dielectric breakdown when stress mitigating layers are present.

In one aspect of the invention, each stress migrating layer has a volume conductivity from about $1 \times 10^{-12}$ S/m to about $1 \times 10^{-8}$ S/m. For example, in one particular aspect, the first and second stress mitigating layers each have a volume conductivity of about $1 \times 10^{-11}$ S/m to about $1 \times 10^{-9}$ S/m.

In another aspect of the invention, the base dielectric layer has a volume conductivity from about $1 \times 10^{-12}$ S/m to about $1 \times 10^{-10}$ S/m.

Figure 5:
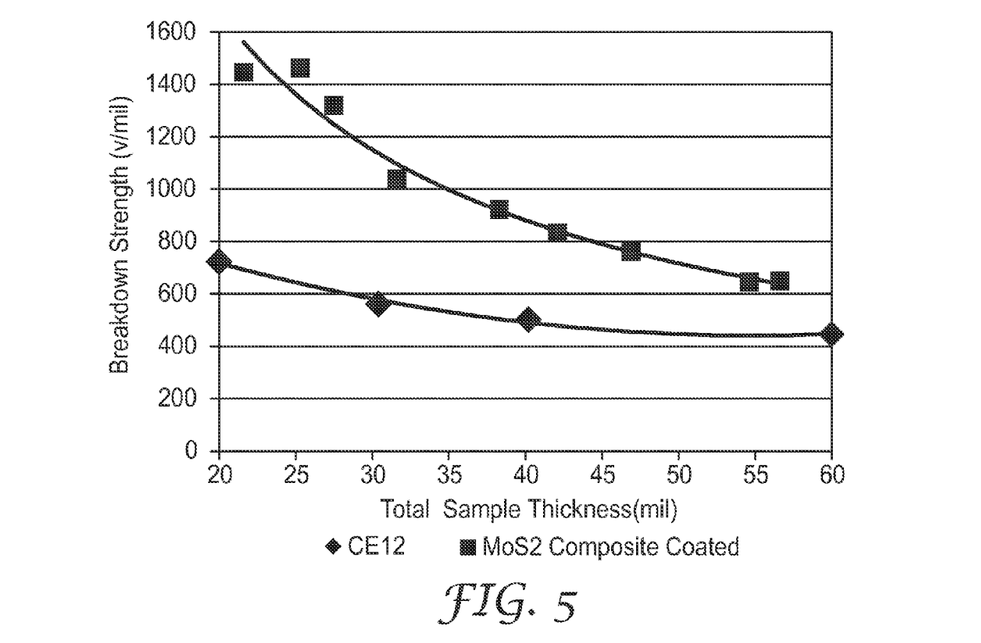
FIG. 5 is a graph showing dielectric breakdown strength as a function of the thickness of a stress mitigating layer comprising molybdenum disulfide.

In addition, the breakdown strength of the multi-layer material 100 can also depend on the thickness of the first and second stress mitigating layers. In one aspect, the first and second stress mitigating layers have a thickness of from about 5 nm to about 80 mil (2 mm). See also FIG. 5, which is discussed in further detail below, which shows breakdown strength as a function of stress mitigating layer thickness.

Suitable materials for the dielectric substrate (base dielectric layer) of embodiments of the present invention include, for example, polymers such as silicone, poly(vinyl chloride), ethylene propylene diene monomer (EPDM) rubber, ethylene propylene rubber (EPR), ethylene vinyl acetate (EVA), polyimide, fluoropolymers, epoxies, polysulfides, polyethylene, and polyester. Other exemplary materials for the base dielectric layer include insulating materials such as mica. Other suitable dielectric layer materials can include, for example, those base dielectric materials listed in Table 2 below. The stress mitigating layers may each comprise a filler material dispersed in a binder material. In some preferable embodiments, the filler material comprises a semiconducting material. Exemplary inorganic semiconducting materials include but are not limited to: silicon (Si), germanium (Ge), gallium arsenide (GaAs), boron arsenide (BAs), indium phosphide (InP), indium arsenide (InAs), gallium antimonide (GaSb), indium antimonide (InSb), gallium phosphide (GaP), boron phosphide (BP), aluminum antimonide (AlSb), aluminum arsenide (AlAs), aluminum phosphide (AlP), cadmium sulfide (CdS), cadmium selenide (CdSe), zinc sulfide (ZnS), zinc oxide (ZnO), copper sulfide ($Cu_2S$) silver sulfide ($Ag_2O$), molybdenum disulfide ($MoS_2$), tungsten disulfide ($WS_2$), nickel (II) phosphide (NiP), tin (II) sulfide (SnS), tin (IV) sulfide ($SnS_2$), lead (II) sulfide (PbS), lead selenide (PbSe), copper (I) oxide ($Cu_2O$), copper (II) oxide (CuO), nickel II oxide (NiO), tin dioxide ($SnO_2$), tin (II) oxide (SnO), molybdenum dioxide ($MoO_2$), titanium dioxide ($TiO_2$), silver gallium arsenide (AgGaAs), and barium titanate ($BaTiO_3$). In some embodiments, the filler material comprises a conductive polymer such as polyaniline, polypyrrole, polythiophene, polyphenylene, poly(p-phenylene sulfide), and their derivatives. In another aspect, the filler material comprises a low band gap semiconducting material. In another exemplary embodiment, the filler may also comprise a doped semiconductor or a semiconductor having vacancies and interstitial defects in the lattice structure formed during synthesis. In other embodiments, the filler material may comprise an insulating material such as boron nitride (BN), aluminum nitride (AlN), mica, or alumina ($Al_2O_3$). The filler material may also comprise a conductive material such as metal, graphene, carbon black, or carbon nanotubes. Other suitable filler materials can include, for example, those materials listed in Table 1 below. The filler material may comprise one type of material or a combination of two or more materials.

The binder material may be selected from a large range of materials, including polymers. Suitable materials for the binder material of the present invention include, for example, the same materials as listed above for the base dielectric layer; polymers such as silicone, poly(vinyl chloride), EPDM rubber, EPR, EVA, polyimide, fluoropolymers, epoxies, polysulfides, polyethylene, and polyester. Other suitable binder materials can include, for example, those binder materials listed in Table 2 below. In some preferable embodiments, the binder material can be the same material as the base dielectric substrate material.

In one aspect, the stress mitigating layers may each comprise about 0.5 volume % to about 100 v % filler material relative to the total volume of the layer. Preferably, the stress mitigating layers may each comprise about 0.5 v % to about 21 v % filler material. More preferably, the stress mitigating layers may each comprise about 2 v % to about 14 v % filler material.

In one aspect, low bandgap semiconductor filler materials can be utilized in order to achieve the conductivity gradient at lower loading levels.

If the filler material is a particulate, it may have any suitable shape such as spheres, plates, platelets, cubes, needles, oblate, spheroids, pyramids, prisms, flakes, rods, fibers, chips, whiskers, etc. or mixtures thereof. In one aspect, the size of each filler material particulate can be from about 10 nm to about 100 μm.

The composition may also comprise other well-known additives for those materials, for example to improve their processability and/or suitability for particular applications. Suitable additives include solvents, dispersing agents, defoaming agents, and surfactants.

First and second stress mitigating layers can have the same or a different composition.

As shown in the examples below, the multi-layer material having a base dielectric layer covered by one or more stress mitigating layers on each major surface yields breakdown strengths much greater than a base dielectric layer by itself or a base dielectric layer covered only on one major side by a stress mitigating layer.

The multi-layer material 100 can be made using a conventional process, such as spraying, dip coating, or bar coating, as described in one or more of the examples described below. In some embodiments, the surface(s) of the base dielectric layer may be rubbed or burnished with a dry powder insulating material to deposit a stress mitigating layer(s) having a thickness of a few nanometers to several microns. Stress mitigating layers formed in this manner may comprise, for example, layered (platelet) semiconductors such as molybdenum disulfide or tungsten disulfide, or a combination thereof.

The compositions of the embodiments described herein can be used in various articles for various applications, e.g., spray, coating, mastics, tapes, and shaped bodies having a definite configuration. The compositions of the embodiments described herein are particularly suitable for use in stress control elements or devices such as high voltage cable accessories, wherein the high dielectric breakdown strength properties of the compositions are useful. Dielectric stress control devices can be manufactured which are designed with respect to their dielectric properties and their geometric configurations in accordance with desirable modifications of an electric field present at the respective site of application. These stress control devices can comprise one or more of the different compositions of the invention described herein.

In a particular aspect, a dielectric stress control device or element can comprise a shaped body, such as a sleeve, which can be placed onto an end of a cable insulation and/or shield. Stress control devices or elements having other geometric configurations may be useful to prevent unacceptably high local field concentrations, for example in loadbreak elbows, transition or through-going connections, feed-throughs and branchings of high voltage cables.

In at least one embodiment, the composition has elastomeric properties. This allows cold-shrink dielectric stress control devices to be manufactured which are suited for different dimensions or sizes of electrical structural components. For example in the case of sleeves, same may have sufficient resilience to be applicable with cable insulations and/or dimensions of various thicknesses.

In addition, as is shown further in the examples, embodiments of the high breakdown strength materials described herein can provide improved electrical performance in water aging tests.

For example, articles of the invention may be used in one or more of the following applications:
  (i) Insulation for electric cables, where the insulation is situated between the conductor and the primary dielectric or between the screen of the cable and the primary dielectric.
  (ii) Insulation for electric cables as in the layered construction described in U.S. Pat. No. 3,666,876.
  (iii) Stress control coverings for electrical cable terminations. Such stress control means may be in the form of sprays, coatings, mastics, molded parts, tubing or tape and may be used with or without an external protective layer, as necessary.
  (iv) Stress control coverings for stator-bar ends or the ends of insulated electrical conductors, e.g., motor windings, in machines.
  (v) Stress control components in lightning arrestors.
  (vi) Components of insulator bodies where the material may be the outer layer or an internal component; for example, sheds or tubing to provide insulators for tension suspension, post or bushing insulators.

In particular, for cables and cable accessories, use of the enhanced breakdown strength multi-layer material embodiments described herein can reduce the amount of insulating material needed in standard medium voltage terminations, splices and modular cable accessories. The enhanced breakdown strength multi-layer material embodiments described herein can also be utilized in transmission cable accessories, as up to a 50% reduction in insulating materials can be realized, resulting in a reduction in costs and product weight. In addition, the amount of insulation needed for power cables can also be greatly reduced. Correspondingly, less semiconducting insulation shield would be needed, as the OD (outer diameter) of the insulation is reduced. In one implementation, this overall reduction in the outer diameter of the cable would allow utilities to replace existing PILC cables in existing downtown ducts and get the same or more power through the system.

Figure 2:
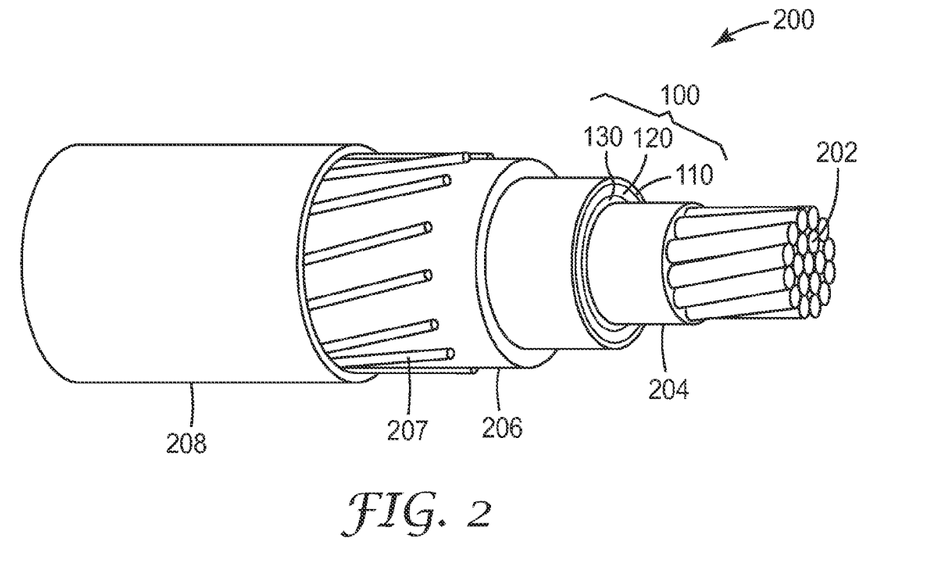
FIG. 2 is an isometric view of a power cable that includes an enhanced breakdown strength material according to another aspect of the invention.

For example, in another aspect of the invention, a power cable can include the enhanced breakdown strength multi-layer material described herein. FIG. 2 shows an example power cable 200, which includes a conductor 202 surrounded by a conductor shielding layer 204. The conductor shielding layer 204 comprises a conductive or semiconducting material. An insulation layer 100, comprising the enhanced breakdown strength multi-layer material described herein surrounds the conductor shielding layer 204. An insulation shielding layer 206 surrounds the insulation layer 100. The insulation shielding layer 206 comprises a semi-conducting material surrounded by a conductor layer 207. A protective outer jacket 208 surrounds the high power cable.

EXAMPLES

The following examples and comparative examples are offered to aid in the understanding of the present invention and are not to be construed as limiting the scope thereof. Unless otherwise indicated, all parts and percentages are by volume. The following test methods and protocols were employed in the evaluation of the illustrative and comparative examples that follow:

Materials List

TABLE 1

FILLER MATERIALS

| Filler | Filler Type | Typical Semiconductor Band Gap @ 300K (eV) | Particle Size (μm) | Source |
|---|---|---|---|---|
| Molybdenum Disulfide ($MoS_2$) | Semi-conducting | 1.7 | <2 | Sigma Aldrich |
| Tungsten Disulfide ($WS_2$) | Semi-conducting | 1.2 | 0.6 | M. K. Impex Corp., Canada |
| Silicon | Semi-conducting | 1.1 | ~2 | Alfa Aesar |
| Cupric Oxide (CuO) | Semi-conducting | 1.2 | <5 | Sigma Aldrich |
| Titanium Dioxide ($TiO_2$) | Semi-conducting | 3.0 | 0.9-1.6 | Alfa Aesar |
| Polyaniline | Semi-conducting | ~3 | Not Provided | Sigma Aldrich |
| Barium Titanate (BT) | Semi-conducting | 3.1 | <2.1 | Ferro |
| Zinc Oxide (ZnO) | Semi-conducting | 3.4 | Not Provided | Sigma Aldrich |
| Alumina ($Al_2O_3$) | Insulating | 5.9 | ~44 | Alumatis |
| Mica | Insulating | — | 17 | Imerys |
| Carbon 5000 | Conducting | — | — | Cabot |
| Carbon 250G | Conducting | — | 0.04 | Ensaco |

TABLE 2

OTHER MATERIALS

| Material | Function | Description | Source |
|---|---|---|---|
| Semicosil 960 | Dielectric Binder | Room Temperature Vulcanizing Silicone Rubber (RTV) | Wacker Silicones |
| Butvar B-98 | Dielectric Binder | Polyvinyl Butyral | Solutica |
| P114 | Dielectric Binder | Synthetic Rubber | 3M |
| PS | Dielectric Binder | Polystyrene | Sigma Aldrich |
| Elastosil LR 3003/30AB | Base Dielectric | Liquid Silicone Rubber (LSR) | Wacker Silicones |
| QS3 | Base Dielectric | Gum Silicone | 3M |
| 1018 (unprimed) | Base Dielectric | Polyvinyl Chloride (PVC) | 3M |
| Kapton-H | Base Dielectric | Polyimide (PI) | Dupont |
| HDPE | Base Dielectric | High Density Polyethylene | Blue Ridge Films |
| Mica | Base Dielectric | Mica (Muscovite) | Axim |
| PET | Base Dielectric | Polyester | 3M |
| KYNAR | Base Dielectric | Polyvinylidene Fluoride (PVDF) | Elf Atochem |
| OS20 | Solvent/Dispersing Agent | Octamethyl Trisiloxane | Dow Corning |

TABLE 3

TEST METHODOLOGIES

| Property | TEST METHOD | TITLE |
|---|---|---|
| Dielectric Breakdown Strength | ASTM D149-09 | Standard Test Method for Dielectric Breakdown Voltage and Dielectric Breakdown Strength of Solid Electrical Insulating Materials at Commercial Power Frequencies |
| Volume Conductivity | ASTM D150-98 (2004) | Standard Test Methods for AC Loss Characteristics and Permittivity (Dielectric Constant) of Solid Electrical Insulation |
| Dielectric Loss, tan(δ) | ASTM D150-98 (2004) | Standard Test Methods for AC Loss Characteristics and Permittivity (Dielectric Constant) of Solid Electrical Insulation |
| Dielectric Constant, K | ASTM D150-98 (2004) | Standard Test Methods for AC Loss Characteristics and Permittivity (Dielectric Constant) of Solid Electrical Insulation |
| Capacitance | ASTM D150-98 (2004) | Standard Test Methods for AC Loss Characteristics and Permittivity (Dielectric Constant) of Solid Electrical Insulation |

Volume Conductivity was calculated from the dielectric constant, K, the frequency, f, and the dielectric loss factor, tan (δ), using the following equation:

$$\text{Conductivity} = \tan(\delta) 2\pi f \varepsilon_0 K$$

in which ε is the permittivity of free space ($8.85 \times 10^{-12}$ F/m).

Sample Preparation

Unless indicated otherwise, exemplary and illustrative dielectric breakdown strength enhancement materials were prepared as follows. Mixtures of filler material and binder were speed mixed at 2500 rpm for 3 minutes using a speed mixer (DAC 150FVZ from Flack Tek, Inc.) to form the stress mitigating coatings. If necessary to facilitate dispersion, some of the filler materials were first premixed in OS20 in an amount of about 10% by wt of filler to prepare a thick slurry, which was then speed mixed with the binder material. Slabs of dielectric base material (3 in×6 in×34-40 mil thick) were prepared by following the manufacturers' recommended procedures. The stress mitigating layer was then bar coated onto the dielectric base substrate to obtain a thin layer (1-2 mil thick). The coated substrates were cured overnight at room temperature. To form a coating on both sides, each substrate was then flipped over to the other side, coated with the second stress mitigating coating layer and again cured overnight at room temperature. This multi-layer material structure is diagrammatically represented in FIG. 1.

Results

Volume conductivity values for the dielectric base materials used to prepare the Comparative and Illustrative Examples are provided in Table 4.

TABLE 4

| DIELECTRIC SUBSTRATE | CONDUCTIVITY (S/m) |
|---|---|
| Silicone | 4.68E-12 |
| Polyester (PET) | 1.12E-11 |
| Polyimide (KAPTON) | 1.27E-11 |
| High Density Polyethylene (HDPE) | 2.02E-12 |
| PVDF (KYNAR) | 6.84E-11 |

Table 5 summarizes the dielectric properties of samples having various constructions. For Comparative Example CE1, a RTV silicone coating (Semicosil 960) containing no filler was applied to both sides of a LSR dielectric base material slab. A stress mitigating material containing 4.4% by volume (v %) molybdenum disulfide ($MoS_2$) in Semicosil 960 RTV silicone was used to prepare Examples 1 and 2 and Comparative Examples CE2 and CE3. For Example 1, 4.4 v % $MoS_2$/RTV coating was applied to both sides of an LSR dielectric base material slab as described previously. For Example 2, an LSR substrate was coated on both sides with the 4.4 v % $MoS_2$/RTV coating as described for Example 1, then the four edges were also coated with the 4.4 v % $MoS_2$/RTV coating via a dip coating method to ensure the silicone substrate was completely encapsulated in the stress mitigating coating. CE2 comprised an LSR slab with a 4.4 v % $MoS_2$/RTV silicone coating applied to only one side. For CE3, a 39 mil (0.99 mm) thick free standing sheet of $MoS_2$ in RTV silicone was prepared by curing $MoS_2$/RTV silicone material in a 3 inch×3 inch (7.6 cm×7.6 cm) mold overnight at room temperature. For Example 3, $MoS_2$ dry powder was burnished (buffed) on both sides of a LSR substrate, then was blown with pressurized air to remove any free flowing powder on the surface of the substrate.

As shown in Table 5, Examples 1, 2, and 3 all demonstrate a dramatic increase in dielectric breakdown strength in comparison to the LSR sample having a coating containing no semiconducting filler (CE1). The free standing sheet of $MoS_2$/RTV silicone (CE3) shows no improvement in dielectric breakdown strength as compared to CE1. The dielectric breakdown test data of the sample coated only on one side with the stress mitigating material (CE2) shows no measurable improvement over the CE1.

TABLE 5

| Example | Dielectric Constant | Dielectric Loss | Thickness | | Dielectric Breakdown Strength | |
|---|---|---|---|---|---|---|
| | | | mil | mm | V/mil | kV/cm |
| CE1 | 2.89 | 0.005 | 39 | 0.99 | 580 | 228 |
| CE2 | 3.0 | 0.009 | 35 | 0.89 | 544 | 214 |
| CE3 | 4.25 | 0.018 | 39 | 0.99 | 410 | 161 |
| Ex. 1 | 2.97 | 0.0066 | 38 | 0.97 | 1121 | 441 |
| Ex. 2 | 3.25 | 0.0125 | 46 | 1.2 | 990 | 390 |
| Ex. 3 | 2.92 | 0.0006 | 35 | 0.89 | 932 | 367 |

Table 6 summarizes the dielectric properties of samples of LSR dielectric base material coated on both sides with $MoS_2$/Semicosil 960 RTV coatings having varying amounts of $MoS_2$. Table 7 summarizes the dielectric properties of samples of LSR dielectric base material coated on both sides with $WS_2$/Semicosil 960 RTV coatings having varying amounts of $WS_2$. As can be seen from Tables 6 and 7, the dielectric breakdown strength of these samples demonstrate a remarkable increase as the loading level of $MoS_2$ and $WS_2$ semiconducting filler material in the stress mitigating coating is increased. In fact, the dielectric breakdown strength increased approximately 100% in comparison to the silicone LSR dielectric base material without a stress mitigating coating (CE1).

TABLE 6

| Example | Amount of $MoS_2$ in RTV coating (vol %) | Dielectric Constant | Dielectric Loss | Thickness | | Dielectric Breakdown Strength | |
|---|---|---|---|---|---|---|---|
| | | | | mil | mm | V/mil | kV/cm |
| CE1 | 0 | 2.89 | 0.005 | 39 | 0.99 | 580 | 228 |
| Ex. 1 | 4.4 | 2.97 | 0.0066 | 38 | 0.97 | 1121 | 441 |

TABLE 6-continued

| Example | Amount of $MoS_2$ in RTV coating (vol %) | Dielectric Constant | Dielectric Loss | Thickness mil | Thickness mm | Dielectric Breakdown Strength V/mil | Dielectric Breakdown Strength kV/cm |
|---|---|---|---|---|---|---|---|
| Ex. 4 | 0.96 | 2.99 | 0.0063 | 39 | 0.99 | 508 | 200 |
| Ex. 5 | 2.0 | 2.97 | 0.0071 | 37 | 0.94 | 860 | 338 |
| Ex. 6 | 10.9 | 3.21 | 0.0178 | 42 | 1.1 | 1130 | 445 |

TABLE 7

| Example | Amount of $WS_2$ in RTV coating (vol %) | Dielectric Constant | Dielectric Loss | Thickness mil | Thickness mm | Dielectric Breakdown Strength V/mil | Dielectric Breakdown Strength kV/cm |
|---|---|---|---|---|---|---|---|
| CE1 | 0 | 2.89 | 0.005 | 39 | 0.99 | 580 | 228 |
| Ex. 7 | 0.65 | 2.99 | 0.0058 | 37 | 0.94 | 608 | 239 |
| Ex. 8 | 1.4 | 2.96 | 0.0061 | 37 | 0.94 | 616 | 243 |
| Ex. 9 | 3.0 | 2.97 | 0.0093 | 37 | 0.94 | 1124 | 443 |
| Ex. 10 | 7.6 | 3.00 | 0.0071 | 39 | 0.99 | 1238 | 487 |

Table 8 compares various dielectric base materials that have been coated on both sides with stress mitigating coatings containing $MoS_2$ to the same dielectric base materials that have been coated on both sides with an unfilled binder coating. Coating thicknesses were approximately 1-2 mil (0.0254-0.05 mm). For each set of examples, the percentage increase in dielectric breakdown strength was calculated. All of the Examples 1 and 11-17 show a significant increase in dielectric breakdown strength in comparison to the respective comparative examples CE1 and CE4-CE10.

TABLE 8

| Ex. | Base Dielectric Material | Coating | Thickness mil | Thickness mm | Dielectric Breakdown Strength V/mil | Dielectric Breakdown Strength kV/cm | Increase in Dielectric BD Strength (%) |
|---|---|---|---|---|---|---|---|
| CE1 | LSR | Unfilled RTV* | 39 | 0.99 | 580 | 228 | 93 |
| Ex. 1 | | 4.4 v % $MoS_2$/RTV* | 38 | 0.97 | 1121 | 441 | |
| CE4 | Gum | Unfilled RTV* | 57 | 1.45 | 505 | 199 | 54 |
| Ex. 11 | Silicone | 4.4 v % $MoS_2$/RTV* | 57 | 1.45 | 778 | 306 | |
| CE5 | PVC | Unfilled RTV* | 6 | 0.15 | 1414 | 557 | 70 |
| Ex. 12 | | 4.4 v % $MoS_2$/RTV* | 7 | 0.18 | 2388 | 940 | |
| CE6 | PI | Unfilled RTV* | 4.7 | 0.12 | 3337 | 1314 | 59 |
| Ex. 13 | | 10.9 v % $MoS_2$/RTV* | 5.1 | 0.13 | 5310 | 2091 | |
| CE7 | HDPE | Unfilled PS | 5.6 | 0.14 | 3160 | 1244 | 65 |
| Ex. 14 | | 7.3 v % $MoS_2$/PS | 6.0 | 0.15 | 5228 | 2058 | |
| CE8 | Mica | Unfilled RTV* | 6.2 | 0.16 | 1292 | 509 | 116 |
| Ex. 15 | | 10.9 v % $MoS_2$/RTV* | 6.3 | 0.16 | 2796 | 1101 | |
| CE9 | PET | Unfilled P114 | 2.2 | 0.056 | 4318 | 1700 | 37 |
| Ex. 16 | | 10 v % $MoS_2$/P114 | 2.3 | 0.058 | 5926 | 2333 | |
| CE10 | PET | Unfilled Butvar B-98 | 2.1 | | 4330 | 1705 | 42 |
| Ex. 17 | | 10 v % $MoS_2$/B-98 | 2.1 | | 6158 | 2424 | |

*RTV used for samples in Table 8 was Semicosil 960 RTV

Free standing sheets of coatings comprising various types and amounts of filler (expressed in volume percentage) in Semicosil 960 RTV binder were prepared and the dielectric properties were measured. The results are provided in Table 9.

TABLE 9

| Ex. | Filler | Filler Loading Level (V %) | Dielectric Constant (K) | Dielectric Loss | Volume Conductivity (S/m) |
|---|---|---|---|---|---|
| Ex. 18 | CuO | 3.5 | 3.05 | 0.0017 | 2.94E−11 |
| Ex. 19 | | 8.9 | 3.92 | 0.0063 | 1.38E−10 |
| Ex. 20 | | 18.1 | 6.02 | 0.0248 | 8.31E−10 |
| Ex. 21 | MoS2 | 2.0 | 3.09 | 0.0006 | 1.09E−11 |
| Ex. 22 | | 4.4 | 4.25 | 0.0179 | 4.23E−10 |
| Ex. 23 | | 10.9 | 6.00 | 0.0633 | 2.11E−09 |
| Ex. 24 | Silicon | 4.2 | 3.21 | 0.0013 | 2.32E−11 |
| Ex. 25 | | 9.0 | 4.00 | 0.0022 | 4.89E−11 |
| Ex. 26 | | 14.6 | 5.05 | 0.0040 | 1.13E−10 |
| Ex. 27 | | 20.9 | 5.39 | 0.0031 | 9.29E−11 |
| Ex. 28 | Barium | 3.7 | 2.57 | 0.0019 | 2.71E−11 |
| Ex. 29 | Titanate | 9.3 | 3.45 | 0.0046 | 8.83E−11 |
| Ex. 30 | | 18.8 | 6.07 | 0.0124 | 4.18E−10 |
| Ex. 31 | TiO2 | 2.4 | 2.85 | 0.0015 | 2.38E−11 |
| Ex. 32 | | 5.2 | 3.41 | 0.0028 | 5.30E−11 |
| Ex. 33 | | 12.8 | 4.77 | 0.0067 | 1.78E−10 |
| Ex. 34 | ZnO | 3.3 | 3.06 | 0.0017 | 2.95E−11 |
| Ex. 35 | | 4.7 | 3.07 | 0.0037 | 6.37E−11 |
| Ex. 36 | | 7.8 | 3.54 | 0.0033 | 6.49E−11 |
| Ex. 37 | | 11.6 | 3.50 | 0.0062 | 1.20E−10 |
| Ex. 38 | $Al_2O_3$ | 6.1 | 2.78 | 0.0121 | 1.87E−10 |
| Ex. 39 | | 14.7 | 3.27 | 0.0246 | 4.46E−10 |
| Ex. 40 | | 27.9 | 3.81 | 0.0666 | 1.41E−09 |
| Ex. 41 | Mica | 7.6 | 3.14 | 0.0442 | 7.70E−10 |
| Ex. 42 | | 18.0 | 3.23 | 0.1223 | 2.51E−09 |
| Ex. 43 | | 33.1 | 3.30 | 0.1096 | 2.01E−09 |
| Ex. 44 | Ag | 4.6 | 4.09 | 0.0013 | 2.95E−11 |
| Ex. 45 | | 6.8 | 10.96 | 0.1574 | 9.58E−09 |
| Ex. 46 | Carbon | 3.4 | 4.34 | 0.0020 | 4.74E−11 |
| Ex. 47 | (Ensaco | 5.1 | 49.10 | 0.2323 | 6.34E−08 |
| Ex. 48 | 250G) | 6.8 | 921.41 | 4.0133 | 2.06E−05 |
| Ex. 49 | Carbon | 3.2 | 1.57 | 0.0009 | 7.8586E−12 |
| Ex. 50 | (Cabot | 5.4 | 5.69 | 0.0079 | 2.50E−10 |
| Ex. 51 | 5000) | 8.4 | 99.47 | 2481.0 | 1.37E−03 |

* Sparking observed during measurements

Table 10 presents the dielectric breakdown strength of an LSR dielectric base material coated on both sides with the stress mitigating coatings described in Table 9, in comparison to a Semicosil 960 RTV silicone base dielectric substrate. A conductivity ratio was calculated as the ratio of the volume conductivity of each stress mitigating layer (from Table 9) to the volume conductivity of the RTV silicone base dielectric layer (4.68×10$^{-12}$ S/m). The results are provided in Table 10.

TABLE 10

| Ex. | Filler | Filler Loading Level (V %) | Thickness | | Conductivity Ratio | Dielectric Breakdown Strength | |
|---|---|---|---|---|---|---|---|
| | | | mil | mm | | V/mil | kV/cm |
| CE11 | None | 0.0 | 37.7 | 0.96 | N/A | 594 | 234 |
| Ex. 18 | CuO | 3.5 | 37.7 | 0.96 | 6.29 | 820 | 323 |
| Ex. 19 | | 8.9 | 36.9 | 0.94 | 29.5 | 922 | 363 |
| Ex. 20 | | 18.1 | 37.7 | 0.96 | 178 | 954 | 376 |
| Ex. 21 | MoS$_2$ | 2.0 | 36.3 | 0.92 | 2.32 | 966 | 380 |
| Ex. 22 | | 4.4 | 38.4 | 0.98 | 90.4 | 1096 | 432 |
| Ex. 23 | | 10.9 | 40.0 | 1.0 | 451 | 1343 | 529 |
| Ex. 24 | Silicon | 4.2 | 36.3 | 0.92 | 4.96 | 729 | 287 |
| Ex. 25 | | 9.0 | 39.0 | 0.99 | 10.4 | 1253 | 493 |
| Ex. 26 | | 14.6 | 39.6 | 1.0 | 24.2 | 1191 | 469 |
| Ex. 27 | | 20.9 | 37.8 | 0.96 | 19.9 | 1214 | 478 |
| Ex. 28 | Barium Titanate | 3.7 | 37.9 | 0.96 | 5.80 | 563 | 222 |
| Ex. 29 | | 9.3 | 39.0 | 0.99 | 18.9 | 656 | 258 |
| Ex. 30 | | 18.8 | 41.6 | 1.1 | 89.4 | 922 | 363 |
| Ex. 31 | TiO2 | 2.4 | 37.1 | 0.94 | 5.08 | 595 | 234 |
| Ex. 32 | | 5.2 | 40.0 | 1.0 | 11.33 | 713 | 281 |
| Ex. 33 | | 12.8 | 38.2 | 0.97 | 38.0 | 765 | 301 |
| Ex. 34 | ZnO | 3.3 | 39.2 | 1.0 | 6.31 | 689 | 271 |
| Ex. 35 | | 4.7 | 38.4 | 0.98 | 13.6 | 834 | 328 |
| Ex. 36 | | 7.8 | 40.2 | 1.0 | 13.9 | 871 | 343 |
| Ex. 37 | | 11.6 | 35.8 | 0.91 | 25.6 | 923 | 363 |
| Ex. 38 | Al$_2$O$_3$ | 6.1 | 38.0 | 0.97 | 39.9 | 614 | 242 |
| Ex. 39 | | 14.7 | 40.2 | 1.0 | 95.3 | 676 | 266 |
| Ex. 40 | | 27.9 | 37.6 | 0.96 | 301 | 604 | 238 |
| Ex. 41 | Mica | 7.6 | 39.0 | 0.99 | 164.63 | 632 | 249 |
| Ex. 42 | | 18.0 | 37.6 | 0.96 | 536.64 | 699 | 275 |
| Ex. 43 | | 33.1 | 42.4 | 1.08 | 430 | 683 | 269 |
| Ex. 44 | Ag | 4.6 | 36.9 | 0.94 | 6.31 | 704 | 277 |
| Ex. 45 | | 6.8 | 38.0 | 0.97 | 2048 | 788 | 310 |
| Ex. 47 | Carbon (Ensaco 250G) | 5.1 | 34.8 | 0.88 | 13.4E+04 | 982* | 387* |
| Ex. 48 | | 6.8 | 35.4 | 0.90 | 4.39E+06 | 989* | 389* |
| Ex. 49 | Carbon (Cabot 5000) | 3.2 | 34.5 | 0.88 | 1.68 | 885 | 348 |
| Ex. 50 | | 5.4 | 35.8 | 0.91 | 53.4 | 1046* | 412* |

*Sparking observed during measurements

Figure 3A:
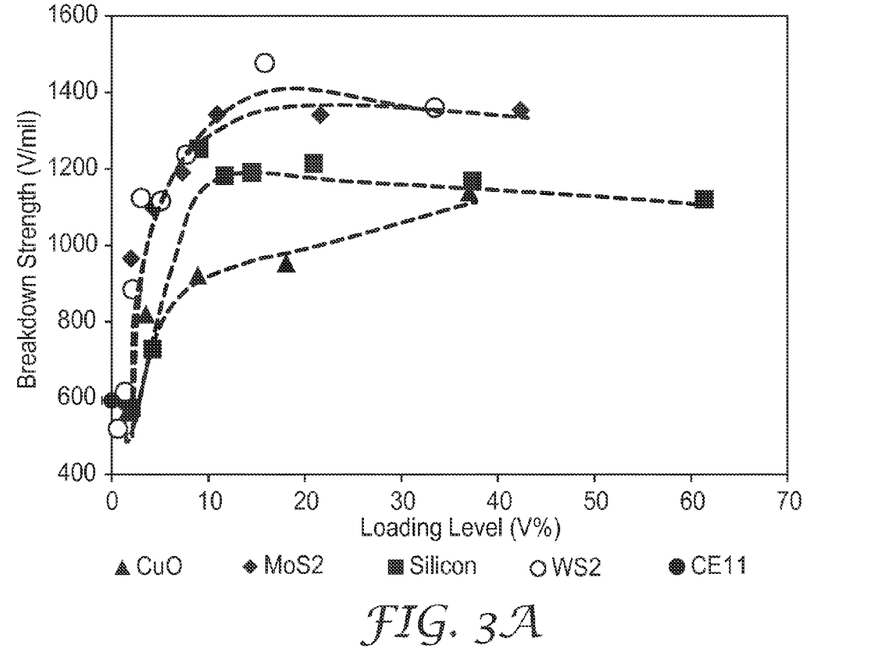
FIG. 3A is a graph showing the breakdown strength versus loading level of a silicone substrate coated with stress mitigating layers of different relatively low bandgap semiconducting fillers.
Figure 3B:
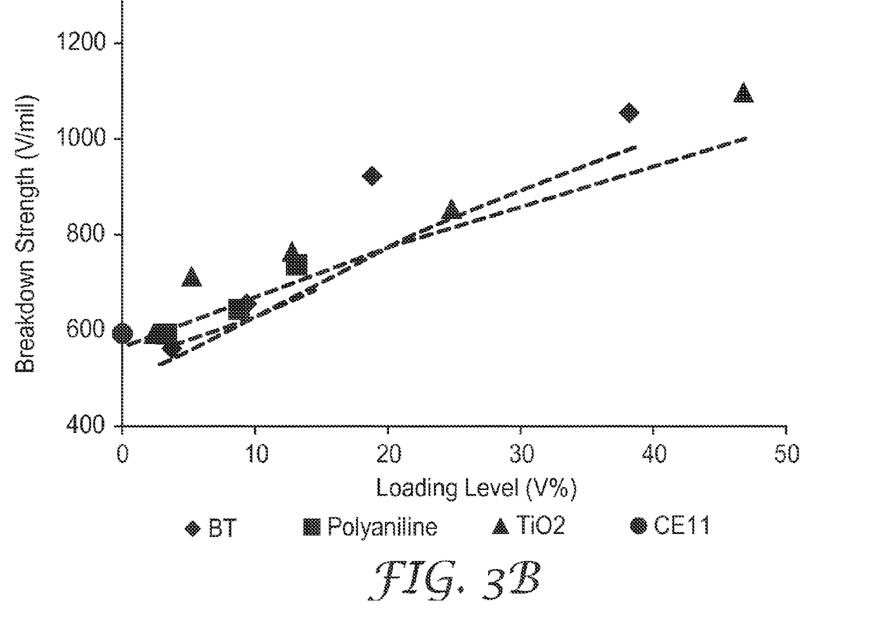
FIG. 3B is a graph showing the breakdown strength versus loading level of a silicone substrate coated with stress mitigating layers of different relatively high bandgap semiconducting fillers.
Figure 3C:
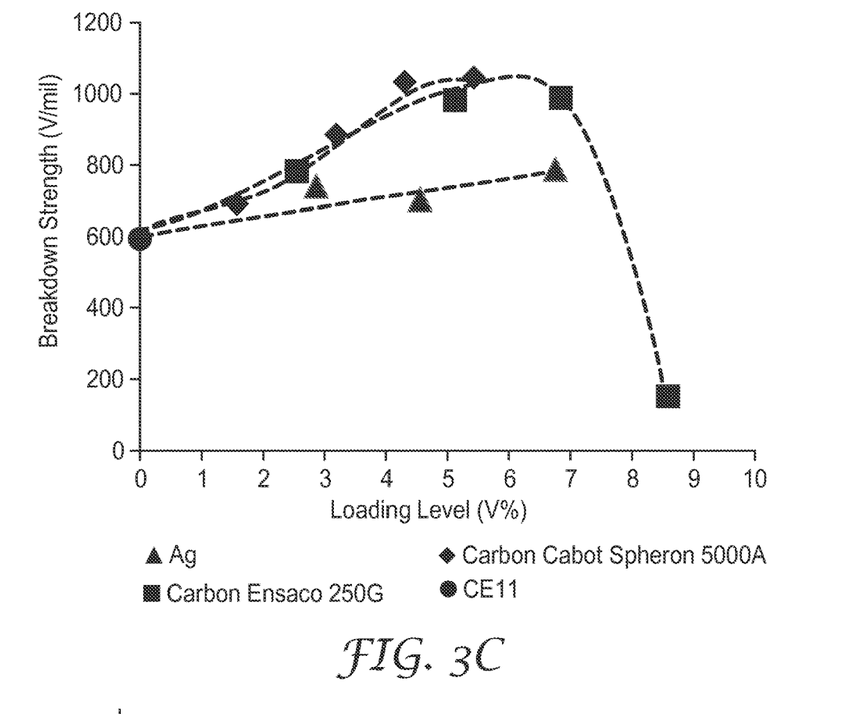
FIG. 3C is a graph showing the breakdown strength versus loading level of a silicone substrate coated with stress mitigating layers of different electronic conducting semiconducting fillers.
Figure 3D:
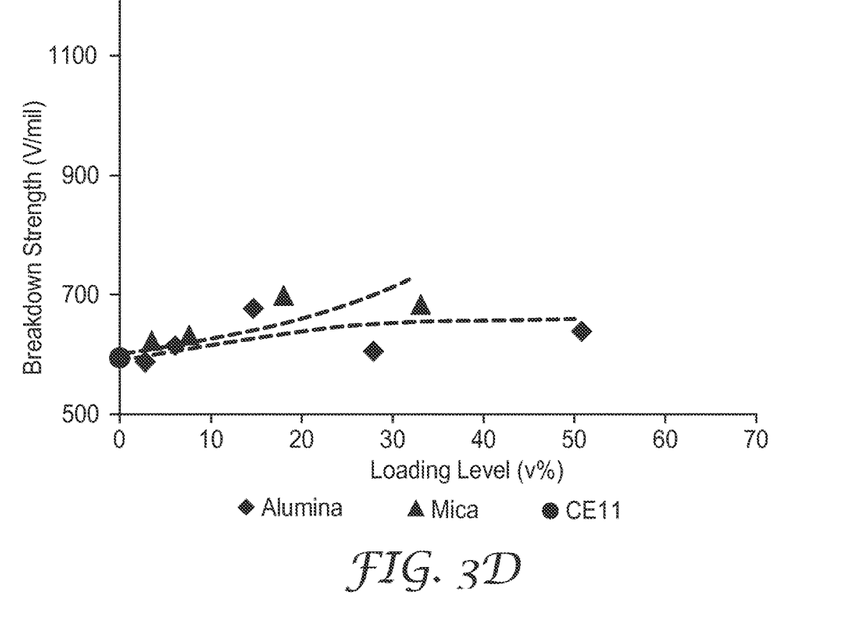
FIG. 3D is a graph showing the breakdown strength versus loading level of a silicone substrate coated with stress mitigating layers of different insulating fillers.

FIGS. 3A-3D illustrate the data in Table 10 as well as data for additional fillers and filler loading levels. FIGS. 3A and 3B show the dielectric strength of samples made with semiconducting filler. FIG. 3C shows the dielectric strength of samples made with electronically conducting filler. The dielectric strength of samples made with coatings comprising insulating fillers are presented in FIG. 3D. In each Figure, the Control sample refers to an LSR base dielectric material coated on both sides with unfilled Semicosil 960 RTV binder (CE1). FIGS. 3A-3D demonstrate that stress mitigating layers, based on either electronically conducting or semiconducting fillers, show an enhancement in dielectric breakdown strength in comparison to the LSR dielectric base material slab with the unfilled RTV silicone. However, tracking and sparking were observed in the samples with electronically conducting fillers, as indicated in Table 10. Therefore, although conductive fillers increase the dielectric breakdown strength, semiconducting fillers may be preferable over conductive fillers due to their ability to increase dielectric breakdown strength in a more controllable manner. Coatings with highly conductive fillers show a decrease in dielectric breakdown strength. Insulating fillers had no appreciable impact on dielectric breakdown strength.

A comparison of the results presented in Tables 9 and 10 and FIGS. 3A-3D demonstrates that volume conductivity of the stress mitigating layer plays a major role in dielectric breakdown enhancement. For example, materials having volume conductivity within the range of 1×10$^{-12}$ S/m to about 1×10$^{-8}$ S/m provide for suitable stress mitigating layers on silicone substrates.

Materials of the present invention also demonstrate enhanced dielectric breakdown strength performance after aging in wet conditions at elevated temperatures. Three types of stress mitigating layer coatings were prepared and coated onto both sides of an LSR dielectric base material, as described in Table 11. To facilitate dispersion of the silicon powder in the RTV 615 silicone dielectric binder, the silicon powder was first premixed in OS20 in an amount of about 10% by wt of powder to prepare a thick slurry, which was then speed mixed with the RTV 615 as described previously. The final ratio of silicon to silicone dielectric binder in the coating was approximately 30% by weight (14.6 v %). A similar multi-layer structure on a silicone substrate was also prepared by using MoS$_2$ as the semiconducting filler. A multi-layer silicone substrate with thin RTV coating (without semiconducting filler) was also prepared as a comparative Example CE11. Samples were aged by immersing in water in a convection oven at 90° C. The samples were removed periodically and surface water was removed by dabbing lightly with a cloth. Dielectric breakdown strength was measured immediately after removing from the oven.

Figure 4:
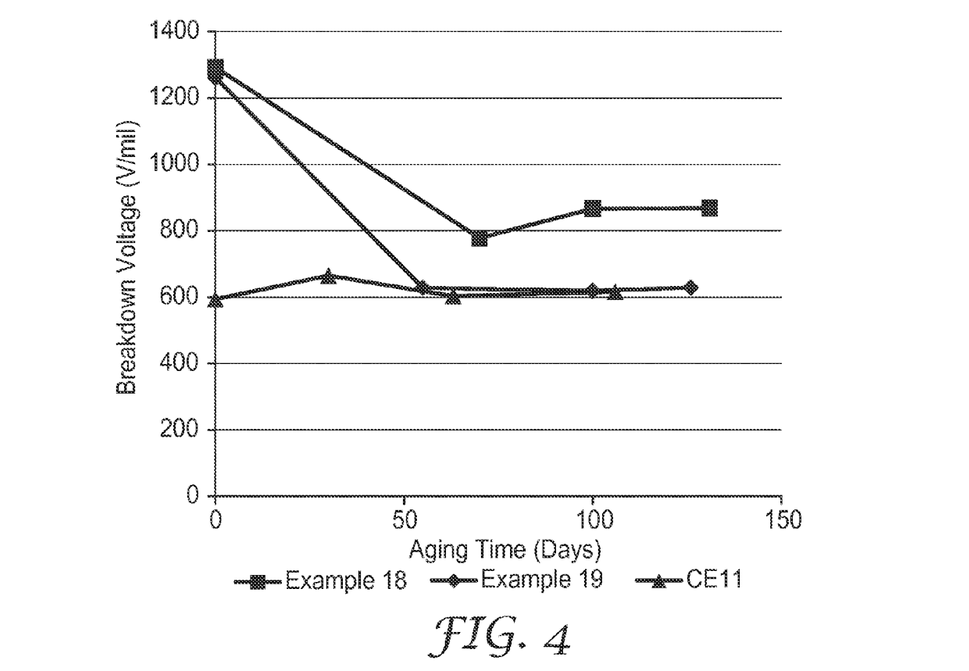
FIG. 4 is a graph showing the dielectric breakdown strength versus time immersed in water at elevated temperature of a silicone substrate coated with stress mitigating layers of $MoS_2$ and silicon fillers.

Table 11 and FIG. 4 show the change in dielectric breakdown strength after aging in water at 90° C. Before aging, the dielectric breakdown strength of both Examples 52 and 53 showed over 100% enhancement with respect to Comparative Example CE11. After water aging, the dielectric breakdown strength of the semiconducting substrates decreases and levels off after some time. Example 52 showed higher retention in dielectric breakdown strength (~68% after 130 days) as compared to Example 53 (~49% after 106 days). Although the dielectric breakdown strength of CE11 does not show any measureable decrease over time, after 130 days of water aging, the dielectric breakdown strength of Example 52 (868 V/mil) is higher than CE11 (616 V/mil) and the dielectric breakdown strength of Example 53 (629 V/mil) is approximately the same as CE11. Furthermore, during these dielectric breakdown tests, Example 52 did not show visible electrical discharges.

TABLE 11

| Ex. | Coating | Time (Days) | Dielectric Breakdown Strength | | Dielectric BD Strength Retention (%) |
|---|---|---|---|---|---|
| | | | V/mil | kV/cm | |
| CE11 | Unfilled RTV | 0 | 594 | 234 | 100 |
| | | 55 | 665 | 262 | 112 |
| | | 100 | 603 | 237 | 102 |
| | | 126 | 616 | 243 | 104 |
| Ex. 52 | 14.6 v % 2 μm silicon/RTV | 0 | 1292 | 509 | 100 |
| | | 70 | 778 | 306 | 60.2 |
| | | 100 | 866 | 341 | 67.1 |
| | | 131 | 868 | 342 | 67.2 |
| Ex. 53 | 4.4 v % MoS$_2$/RTV | 0 | 1261 | 497 | 100 |
| | | 30 | 628 | 247 | 49.8 |
| | | 63 | 618 | 243 | 49.1 |
| | | 106 | 629 | 248 | 49.0 |

The effect of stress mitigating coating layer thickness on dielectric breakdown strength was also examined. 20 mil thick pieces of LSR silicone dielectric base material were coated on both sides with various thicknesses of stress mitigating coatings containing 4.4 v % MoS$_2$ filler in Semicosil 960 RTV silicone binder. Stress mitigating coating thicknesses varied from about 0.8 mil to about 18 mil (0.02 to 0.46 mm), yielding total samples thicknesses ranging from about 21.6 mil to about 56.6 mil (0.55 to 1.44 mm). For comparison, a set of uncoated LSR silicone slabs having comparable total thickness was also prepared (CE12). Results are presented in FIG. 5, which demonstrates that the improvement in dielectric breakdown strength is greatest for thin stress mitigating coatings layers.

Figure 6:
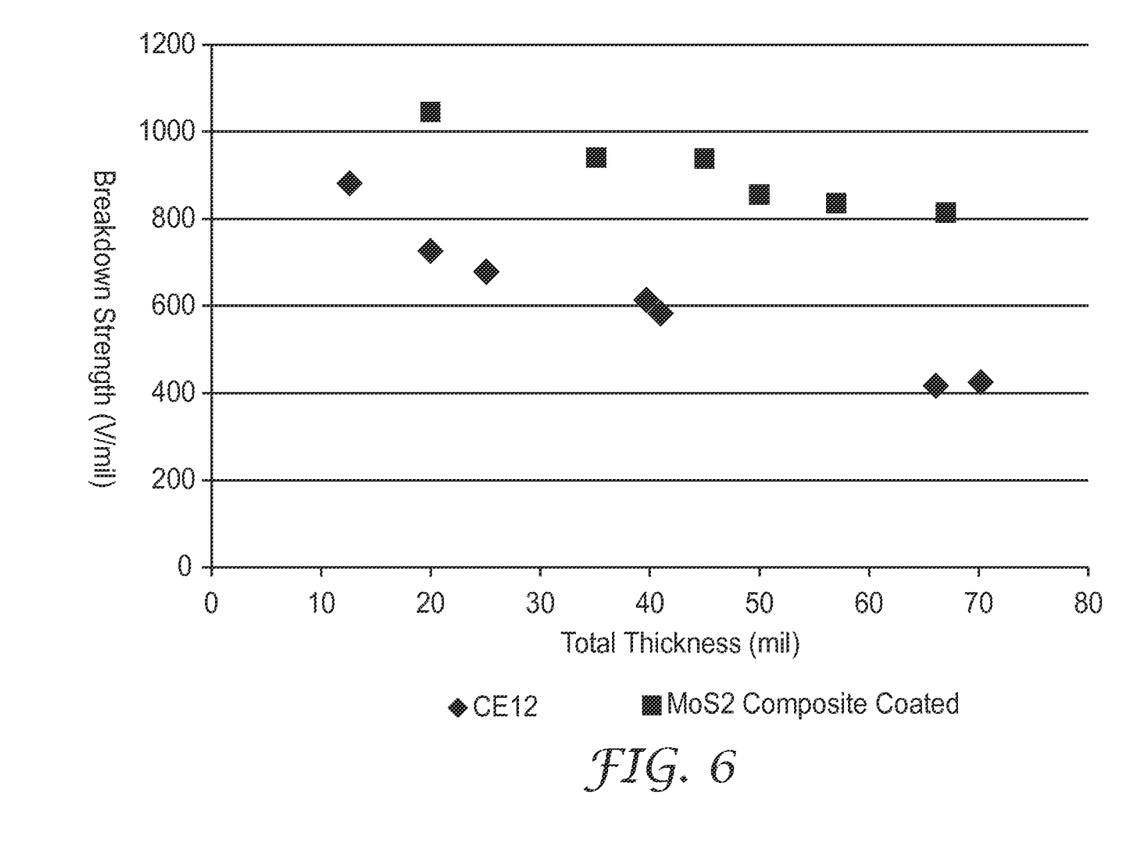
FIG. 6 is a graph showing dielectric breakdown strength as a function of the thickness of the dielectric base material which has been coated on both sides with thick stress mitigating coatings containing 4.4% $MoS_2$ filler.

Various thicknesses of LSR silicone dielectric base material were coated on both sides with a 5 mil (0.13 mm) thick stress mitigating coating containing 4.4 v % $MoS_2$ filler in Semicosil 960 RTV silicone binder. Uncoated LSR silicone slabs having comparable total thicknesses were also tested for comparison (CE12). Dielectric breakdown strength measurements are presented in FIG. 6, which shows that an improvement in dielectric breakdown strength is obtained even when the thickness of the stress mitigating coating layer becomes a smaller proportion of the total sample thickness.

Stress mitigating coatings of the present invention were also evaluated for performance in an electrical splice. A coating solution containing 20 parts by weight $MoS_2$ and 80 parts by weight Semicosil 960 RTV was diluted with 20 parts by weight OS20 to reduce viscosity. Cold shrinkable silicone tubes having an inner diameter of 0.38" (9.65 mm) and lengths of approximately 8" (20 cm) and 12" (30 cm) were dip coated in this solution to obtain a homogenous coating on both the inner and outer surface of the tubes. After removal of the OS20 solvent, the final composition of the coating was 4.4 vol % (20 wt %) $MoS_2$. The cold shrink tubes were then expanded onto a removable support core. Comparative Examples CE12 and CE13 were uncoated.

Splices were assembled as follows. Two ends of 15 kV 1/0 AWG power cable were prepared for a splice installation. The cold shrinkable sample tube was parked on one of the cables and the ends of the cables were connected with a connector. The connector was covered with semiconducting tape (SCOTCH 13 Tape from 3M Company, US) which extended onto the cable insulation. The cable insulation, the semiconducting tape, and the edges of the semiconducting layers of the cables were then covered with fluorocarbon grease (P55/R from 3M Company, US) to fill in any air voids. The silicone tube was then installed on the cable with each end of the tube extending at least 0.5" (1.27 cm) onto the cable semiconducting layer on each end by removing the support core and following the 3M cold shrink installation process. The tubing was overwrapped with semiconductive tape and then metallic mesh (SCOTCH 24 Electrical Shielding Tape from 3M Company, US) was applied over the tube from the metallic shield of one cable to the metallic shield on the other cable. Finally, the entire joint was covered with vinyl electrical tape.

The splices were then evaluated for performance under high voltage. A partial discharge test was run and then an AC step test, in which the AC voltage was increased by 5 kV every 5 minutes. The test results are summarized in Table 12. In Table 12, CSV refers to Corona starting voltage and CEV refers to Corona extinction voltage. For Examples 54 and 55, which were 8" in length, failure did not occur through the insulation; rather, the failure went down the interface between the tube and the cable insulation. For the 12" samples, the AC step failure level of the cable joint using the molybdenum disulfide coated silicone tube (Example 56, >70 kV) is significantly higher than that of the cable splice using the uncoated silicone tube (CE13, <40 kV). For Example 56, the stress mitigating coating did not completely cover the interior surface of the silicone tube, which may have lead to a decreased breakdown level and the radial failure.

TABLE 12

| Test # | Description | Length, inches (cm) | Partial Discharge Value (kV) | AC Step Failure Level | Failure Mode |
|---|---|---|---|---|---|
| CE12 | Uncoated Silicone Tube | 8 (20) | N/A | Failed on rise to 40 kV | Radial through insulation |
| CE13 | Uncoated Silicone Tube | 12 (30) | CSV = 18.9 CEV = 15.5 | 35 kV after 23 seconds | Radial through insulation |
| Ex. 54 | Silicone tube with 20% $MoS_2$/RTV coating | 8 (20) | N/A | 55 kV | Down interface |
| Ex. 55 | Silicone tube with 20% $MoS_2$/RTV coating | 8 (20) | CSV = 13 CEV = 11.7 | 80 kV after 5 minutes | Down interface |
| Ex. 56 | Silicone tube with 20% $MoS_2$/RTV coating | 12 (30) | CSV = 18.5 CEV = 15.9 | 70 kV after 1 min | Radial through insulation |

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An enhanced breakdown strength dielectric material comprising:
   a base dielectric layer having first and second opposing major surfaces,
   a first stress mitigating layer disposed on the first major surface of the base dielectric layer, and
   a second stress mitigating layer disposed on the second major surface of the base dielectric layer,
   wherein a ratio of a volume conductivity of at least one of the first and second stress mitigating layers to a volume conductivity of the base dielectric layer is greater than or equal to 2, wherein each stress migrating layer comprises a molybdenum disulfide ($MoS_2$) filler material having a concentration of about 0.8% to about 12% by volume based on the total volume of the stress migrating layer.

2. The enhanced breakdown strength dielectric material of claim 1, wherein the filler material is dispersed in a binder material.

3. The enhanced breakdown strength dielectric material of claim 2, wherein the filler material comprises one or more particulates, each having a shape selected from spheres, plates, platelets, cubes, needles, oblate, spheroids, pyramids, prisms, flakes, rods, fibers, chips, whiskers, and mixtures thereof.

4. The enhanced breakdown strength dielectric material of claim 3, wherein the size of each filler material particulate can be from about 10 nm to about 100 μm.

5. The enhanced breakdown strength dielectric material of claim 1, wherein at least one of the first and second stress mitigating layers comprises a binder material, wherein the binder material comprises a polymer selected from the group consisting of silicone, poly(vinyl chloride), EPDM rubber, EPR, EVA, polyimide, fluoropolymers, epoxies, polysulfides, polyethylene, and polyester.

6. The enhanced breakdown strength dielectric material of claim 1, wherein the base dielectric layer comprises a material selected from the group consisting of polymers and insulating materials.

7. The enhanced breakdown strength dielectric material of claim 1, wherein each stress migrating layer has a volume conductivity from about $1 \times 10^{-12}$ S/m to about $1 \times 10^{-8}$ S/m.

8. A power cable, comprising:
a conductor;
a first shielding layer surrounding the conductor;
an insulation layer comprising the enhanced breakdown strength dielectric material of claim 1;
a second shielding layer surrounding the insulation layer; and
a protective jacket surrounding the second shielding layer.

9. A dielectric stress control device comprising a shaped body that includes an insulation layer comprising the enhanced breakdown strength dielectric material of claim 1.

10. A mastic comprising the enhanced breakdown strength dielectric material of claim 1.

11. A tape comprising the enhanced breakdown strength dielectric material of claim 1.

12. An enhanced breakdown strength dielectric material comprising:
a base dielectric layer having first and second opposing major surfaces,
a first stress mitigating layer disposed on the first major surface of the base dielectric layer, and
a second stress mitigating layer disposed on the second major surface of the base dielectric layer,
wherein a ratio of a volume conductivity of at least one of the first and second stress mitigating layers to a volume conductivity of the base dielectric layer is greater than or equal to 2, wherein each stress migrating layer comprises a tungsten disulfide (WS2) filler material having a concentration of about 0.5% to about 16% by volume based on the total volume of the stress migrating layer.

13. A power cable, comprising:
a conductor;
a first shielding layer surrounding the conductor;
an insulation layer comprising the enhanced breakdown strength dielectric material of claim 12;
a second shielding layer surrounding the insulation layer; and
a protective jacket surrounding the second shielding layer.

14. A dielectric stress control device comprising a shaped body that includes an insulation layer comprising the enhanced breakdown strength dielectric material of claim 12.

15. A mastic comprising the enhanced breakdown strength dielectric material of claim 12.

16. A tape comprising the enhanced breakdown strength dielectric material of claim 12.

* * * * *

UNITED STATES PATENT AND TRADEMARK OFFICE
CERTIFICATE OF CORRECTION

PATENT NO. : 10,121,570 B2
APPLICATION NO. : 15/519399
DATED : November 6, 2018
INVENTOR(S) : Nanayakkara Somasiri It is certified that error appears in the above-identified patent and that said Letters Patent is hereby corrected as shown below:

In the Specification

Column 8, Line 35 (Approx.):
Delete "Povided" and insert -- Provided --, therefor.

Column 9, Line 27 (Approx.):
Delete "εis" and insert -- ε0 is --, therefor.

Column 14, Line 35:
Delete "measureable" and insert -- measurable --, therefor.

Signed and Sealed this
Twenty-seventh Day of August, 2019

Andrei Iancu
*Director of the United States Patent and Trademark Office*